(12) United States Patent
AlDossary

(10) Patent No.: US 8,696,357 B2
(45) Date of Patent: Apr. 15, 2014

(54) TACTILE COMMUNICATION APPARATUS, METHOD, AND COMPUTER PROGRAM PRODUCT

(76) Inventor: Thieab AlDossary, Washington, DC (US)

( * ) Notice: Subject to any disclaimer, the term of this patent is extended or adjusted under 35 U.S.C. 154(b) by 0 days.

(21) Appl. No.: 13/564,395

(22) Filed: Aug. 1, 2012

(65) Prior Publication Data

US 2014/0038139 A1 Feb. 6, 2014

(51) Int. Cl.
*G09B 21/00* (2006.01)
(52) U.S. Cl.
CPC .................................. *G09B 21/001* (2013.01)
USPC ......................................................... 434/114
(58) Field of Classification Search
USPC ......................................... 434/112, 113, 114
See application file for complete search history.

(56) References Cited

U.S. PATENT DOCUMENTS

| | | | |
|---|---|---|---|
| 6,159,013 A * | 12/2000 | Parienti .......................... | 434/114 |
| 6,230,135 B1 * | 5/2001 | Ramsay et al. ................ | 704/271 |
| 6,466,911 B1 | 10/2002 | Cowan et al. | |
| 6,762,749 B1 * | 7/2004 | Gouzman et al. ............. | 345/163 |
| 7,855,657 B2 * | 12/2010 | Doemens et al. ........... | 340/686.6 |
| 8,138,896 B2 | 3/2012 | Fadell et al. | |
| 8,362,883 B2 * | 1/2013 | Hale et al. ................... | 340/407.1 |
| 8,451,240 B2 * | 5/2013 | Pasquero et al. ............. | 345/173 |
| 2003/0063776 A1 * | 4/2003 | Sato .............................. | 382/106 |
| 2005/0060088 A1 * | 3/2005 | Helal et al. .................... | 701/208 |
| 2007/0254268 A1 * | 11/2007 | Adachi et al. ................. | 434/112 |
| 2010/0109918 A1 * | 5/2010 | Liebermann .................... | 341/21 |
| 2012/0070805 A1 | 3/2012 | Wong et al. | |
| 2013/0157229 A1 * | 6/2013 | Lauritzen et al. ............. | 434/112 |
| 2013/0164717 A1 * | 6/2013 | Bourdon et al. .............. | 434/114 |

OTHER PUBLICATIONS

R. Velasquez, "Wearable Assistive Devices for the Blind," Chapter 17 in A. Lay-Ekuakille & S.C. Mukhopadhyay (Eds.), Wearable and Autonomous Biomedical Devices and Systems for Smart Environment: Issues and Characterization, LNEE 75, Springer, pp. 331-349, 2010.

* cited by examiner

*Primary Examiner* — Sam Yao
*Assistant Examiner* — Michael Humphrey
(74) *Attorney, Agent, or Firm* — Oblon, Spivak, McClelland, Maier & Neustadt, L.L.P.

(57) ABSTRACT

A tactile communication apparatus that includes a signal receiver configured decode data received via a wireless signal, a tactile communication device containing a plurality of pins on one side, each pin configured to respectively move in both an outward direction and inward direction to form a plurality of pin combinations based on a plurality of activation signals, and a communication processor configured to generate the plurality of pin activation signals based on the received data so as to convey the data to a user through the plurality of pin combinations of the tactile communication device.

10 Claims, 12 Drawing Sheets

TACTILE COMMUNICATION APPARATUS, METHOD, AND COMPUTER PROGRAM PRODUCT

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

BACKGROUND

Field of the Disclosure

Embodiments described herein relate generally to an apparatus, method, and computer program product for tactile communication. More particularly, the embodiments described relate to an apparatus that can facilitate data communications for (users who are occupying the use of their visual and auditory senses) and the visually impaired.

SUMMARY

According to an embodiment, there is provided a tactile communication apparatus that includes a signal receiver configured decode data received via a wireless signal, a tactile communication device containing a plurality of pins on one side, each pin configured to respectively move in both an outward direction and inward direction to form a plurality of pin combinations based on a plurality of activation signals, and a communication processor configured to generate the plurality of pin activation signals based on the received data so as to convey the data to a user through the plurality of pin combinations of the tactile communication device.

According to another embodiment, there is also provided a method of tactile communication The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the present advancements and many of the attendant advantages thereof will be readily obtained as the same becomes better understood by reference to the following detailed description when considered in connection with the accompanying drawings. However, the accompanying drawings and the exemplary depictions do not in any way limit the scope of the advancements embraced by the specification. The scope of the advancements embraced by the specification and drawings are defined by the words of the accompanying claims.

DETAILED DESCRIPTION OF THE EMBODIMENTS

Figure 1:
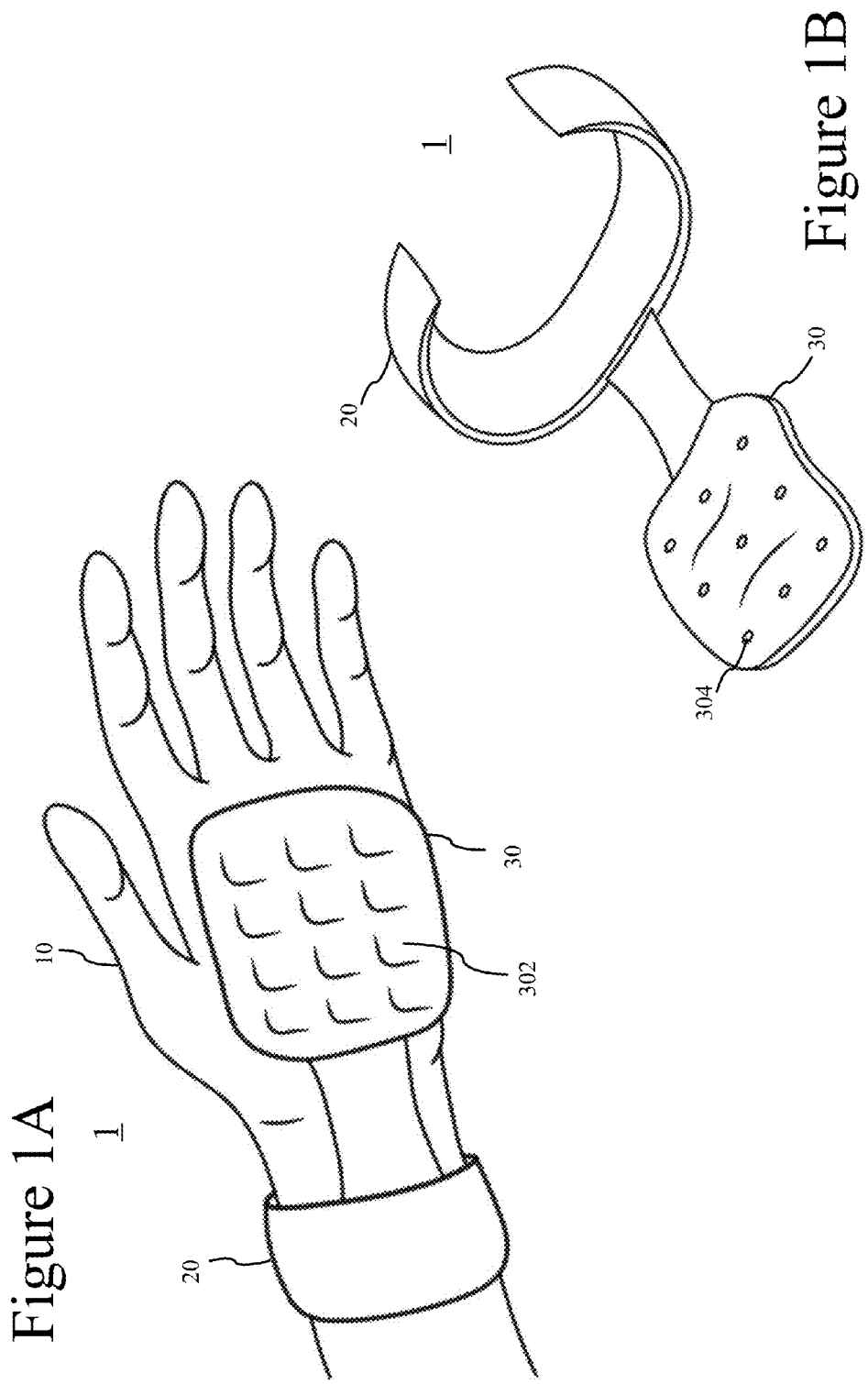
FIGS. 1A and 1B illustrate a front view and a rear view, respectively, of a tactile communication apparatus according to an exemplary embodiment.

Tremendous developments have occurred with mobile communication devices in a very short time frame. However they have been dependant on the users' visual or auditory senses to interact with them often causing the user to have to pause whatever they are doing to use the device. Tactile communication allows the users to feel the information, enabling less disruption to their physical activities in certain cases.

The present inventor recognized the need to improve the way information can be communicated discreetly to individuals without interruption to their visual and auditory activities and to assist navigation and communication while they are in motion. With the way computer technology is advancing and the way it is changing the lives of people, adequate methods of communication need to be established to tackle issues especially in a mobility situation.

The tactile communication apparatus is designed to communicate data such as simple text in a physical or tactile manner. Text can be communicated, for example, in the form of Braille and directions in the form of directional tactile indication. The tactile communication apparatus combines both a hardware unit to work alongside computer software. It is designed to be versatile in the sense that it can work with several software programs as well as wired and wireless networks. Along with simple text and directional communications, the tactile communication apparatus is able to interact with the surrounding environment to communicate additional data such as tag detection, GPS navigation, object recognition and identification, obstacle detection, etc.

The tactile communicator has also been ergonomically designed to tackle many mobility communication issues highlighted in the user research. It introduces a new way of communication to mobile Smartphone users in such a way that their visual and auditory senses are not interrupted. The communication method is discrete, light, easy to use, unrestrictive and very useful for navigation in an outside mobile environment.

Referring now to the drawings, wherein like reference numerals designate identical or corresponding parts throughout several views.

FIG. 1A illustrates a front view of a tactile communication apparatus 1 according to an exemplary embodiment. The tactile communication apparatus 1 consists of two main parts: a processing section 20 and a tactile communication device 30. The processing section 20 receives signals and data from external sources and generates pin activation signals based on the data to be communicated to a user 10. The tactile communication device 30 receives pin activation signals and activates a plurality of pin combinations in a particular sequence so physically communicate data to the user 10 through a tactile projection and/or haptic mechanism (e.g., vibration). FIG. 1B illustrates a rear view of the tactile communication apparatus 1.

The processing section 20 receives data from any number of wired or wireless inputs. Such wired inputs may be received via a network cable, fiber optic cable, USB cable, firewire cable, or the such. Wireless inputs may be received from any form of wireless network such a WiFi, cellular, or near field communication type systems and associated protocols. Once a signal from a wired or wireless network is received by the processing section 20, it is processed by the appropriate processing portion to decode the signal to useful information and/or data. Activation signals for the tactile communication device 30 are then generated based on the decoded information and/or data.

The tactile communication device 30 facilitates communication with the user 10 through both a receiving data from the user 10 through a keypad 302 and transmitting data to the user 10 through a set of pins 304. Information received by the processing section 20 is processed and activation signals for the set of pins 302 are generated and sent to the tactile communication device 30. The tactile communication device 30 then activates the appropriate sequence of pins 304 to convey the information or data to the user 10 through a tactile indication.

Figure 2:
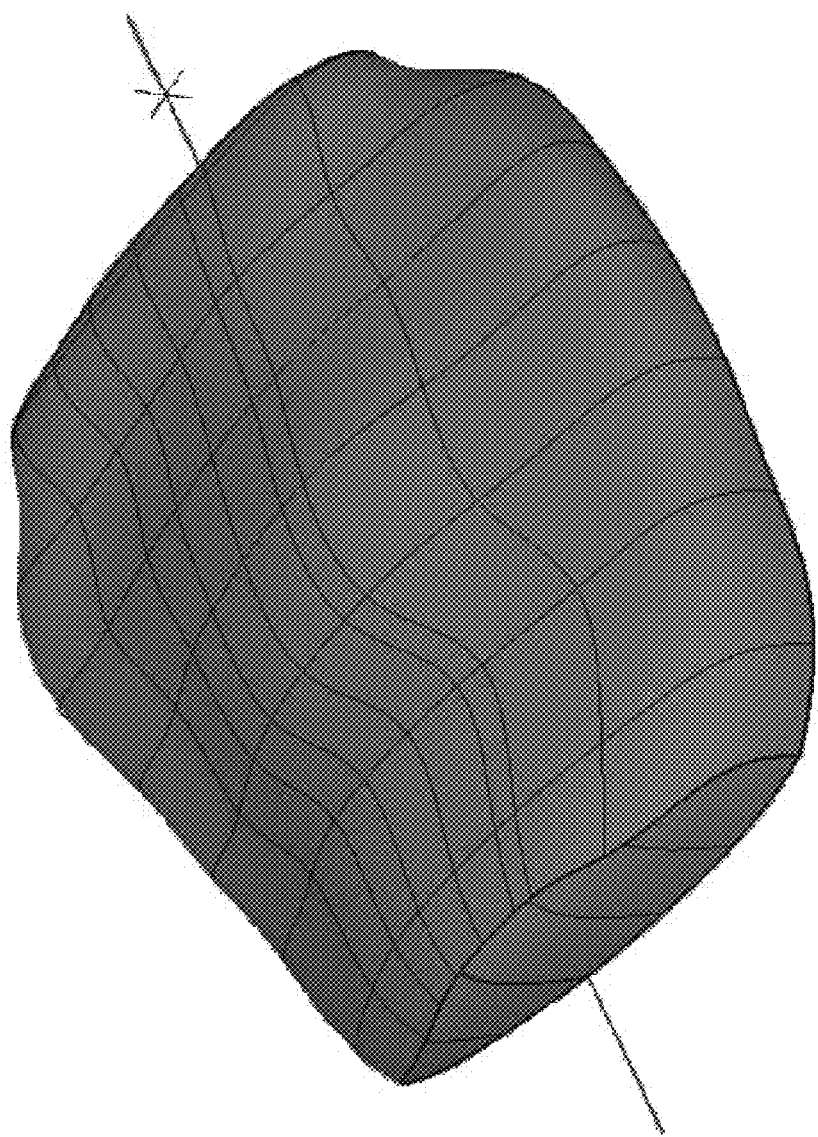
FIG. 2 illustrates an ergonomic design of the tactile communication device according to an exemplary embodiment.

The tactile communication device 30 is ergonomically designed, as illustrated in FIG. 2 which show the rear section of the tactile communication device 30 corresponding to FIG. 1B, so as to comfortably and completely contour to the shape of the palm of the user's 10 hand. This allows a more efficient and effective method of tactile communication with the user 10 because the pins 304 of the tactile communication device 30 are more likely to come into contact with the user 10 and the user 10 is more likely to understand and recognize the sequence of pin activations from the tactile communication device 30.

The front section of the tactile communication device 30, as illustrated in FIG. 1A, is flat and contains a keypad 302. The keypad 302 can contain any number of keys in any number of configurations. The user 10 can use the keypad 302 as an interface to initiate communication or respond to received communication. For a non-limiting example, the keypad 302 can be of a similar configuration to that of a standard or mobile telephone alpha/numeric keypad where the first key corresponds to 1 or ABC, the second key corresponds to 2 or DEF, etc. When the user 10 wants to input a message that starts with the letter "B," the user will press the first key two times to indicate that the second character of the first key is desired to be input. In a second non-limiting example, the tactile communication device 30 or processing section 20 can be equipped with software where the user 10 presses keys containing the desired letters once and the software will infer the desired word/phrase based on the keypad 302 combinations pressed by the user 10.

Figure 3:
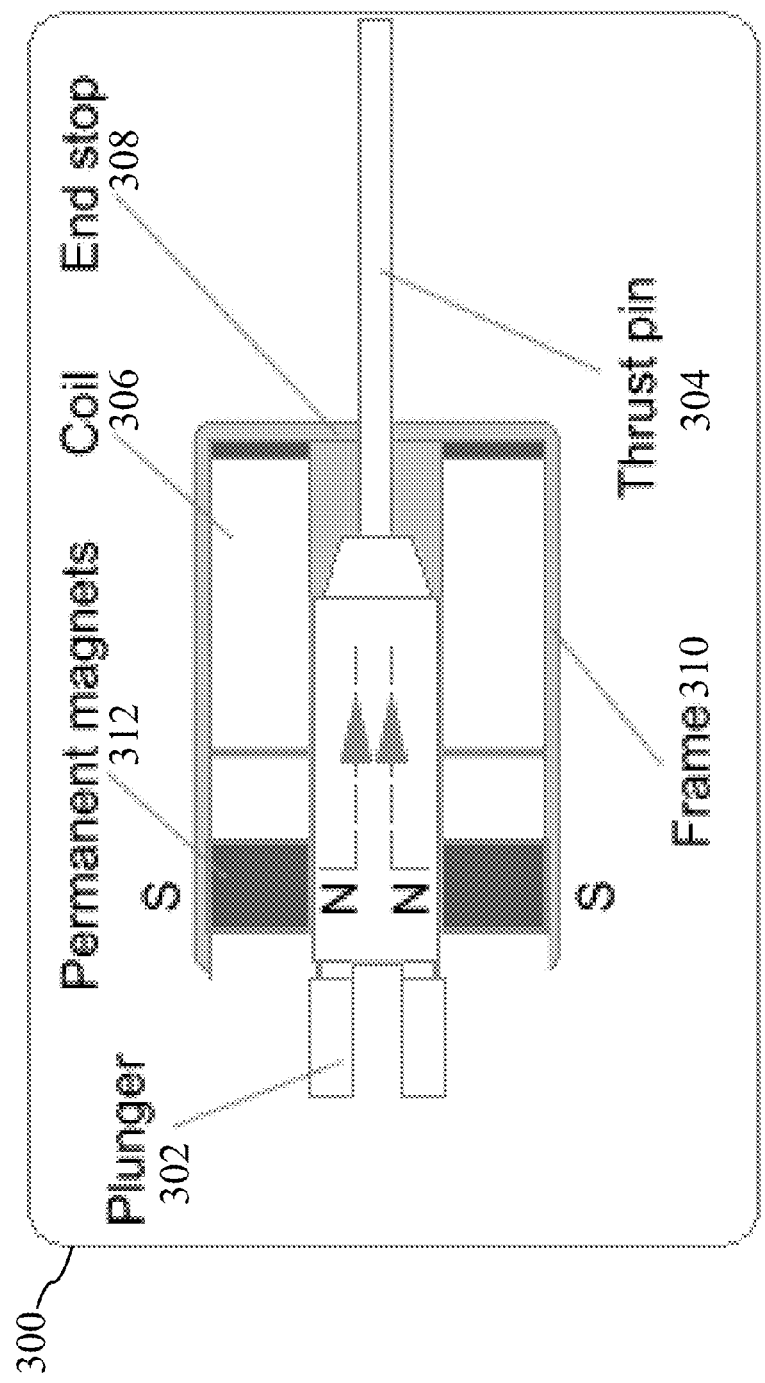
FIG. 3 illustrates a pin of the tactile communication device according to an exemplary embodiment.

The pins 304 of the tactile communication device 30 can be any form of mechanism that can convey a tactile indication, such as a solenoid 300 illustrated in FIG. 3. In an exemplary embodiment, the solenoid 300 contains a plunger 302, a pin 304, a coil 306, an end stop 308, a frame 310, and a set of permanent magnets 312. A pin activation signal generated at the processing section 20 actuates the solenoid 300 via the permanents magnets 312 and the coil 306. This causes the plunger 302 to push the pin 304 in an outward direction until the pin reaches the end stop 308. When the pin 304 is moving in an outward direction, it comes into contact with the user 10 providing a tactile indication. When the activation signal is no longer present, the plunger 302 returns to its initial state and the pin 304 moves in an inward direction. When the pin 304 is moving in an inward direction, it comes out of contact with the user 10 and no longer provides a tactile indication. Through the use of multiple solenoids, combinations of tactile indications can be created by activating the multiple solenoids through specific sequences so as to physically communicate data and information.

The sequence in which the pins 304 are activated can correspond to any form of code or language understood by the user 10 such as Braille which is commonly used by the blind or people with limited visual capability.

Figure 4A:
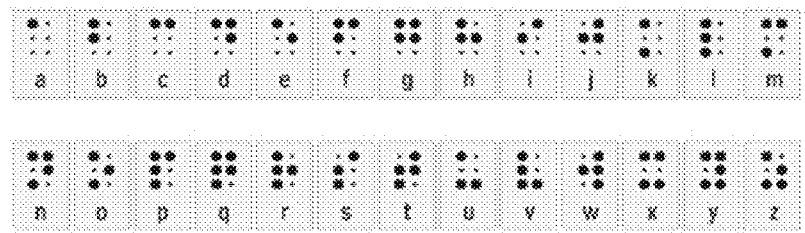
FIGS. 4A and 4B illustrate Braille code and the corresponding output of the tactile communication device according to an exemplary embodiment.
Figure 4B:
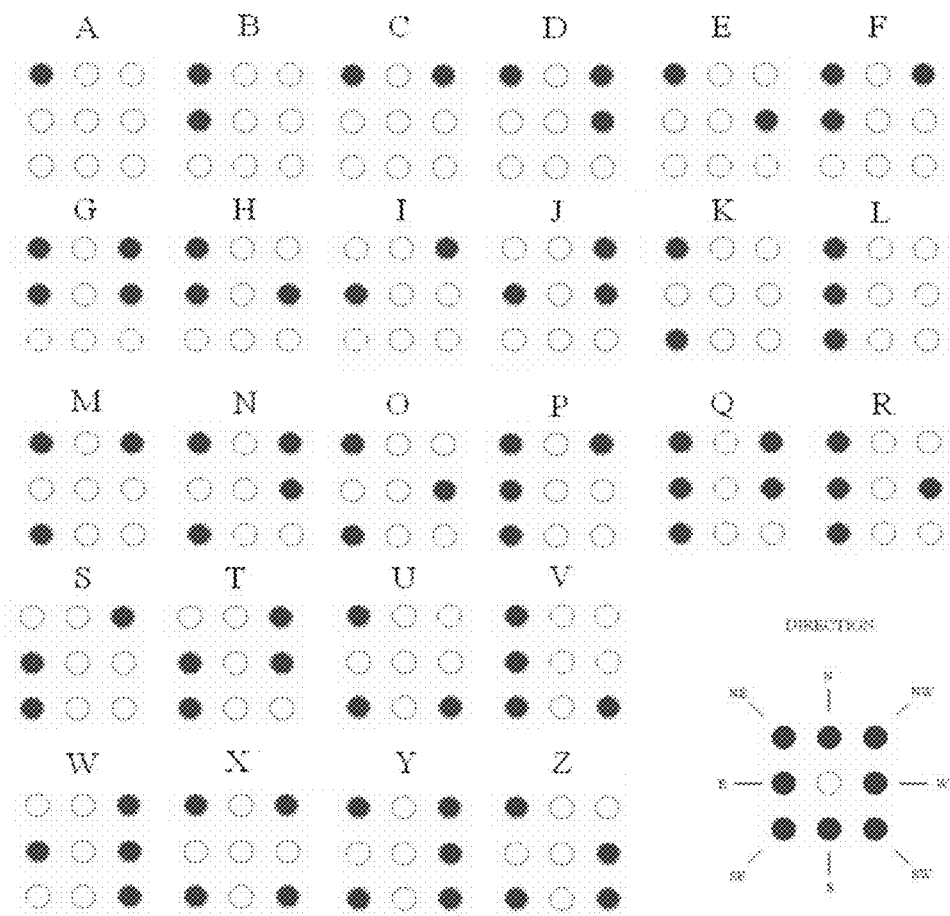

FIG. 4A illustrates the letters of the alphabet and the corresponding Braille code. The user 10 will recognize letters based on a specific pin 304 combination based on the Braille code and be able to spell out words over a series of pin 304 combinations. FIG. 4B illustrates the pin 304 combinations presented to the user 10 based on the tactile communication device 30 as discussed above. It should be noted that in non-limiting illustration in 4B, that the left most column and the right most column are used to present characters according to the Braille code, but any configuration may be used that is easily understandable by the user 10.

FIG. 4B also illustrates how direction information is passed to the user 10 based on cardinal direction indications such as North, South, East, West, etc. When communicating directional information, the tactile communication apparatus 1 can guide the user 10 to any specified target or location using cardinal directions based on the pin 304 combinations illustrated in 4B.

Figure 5:
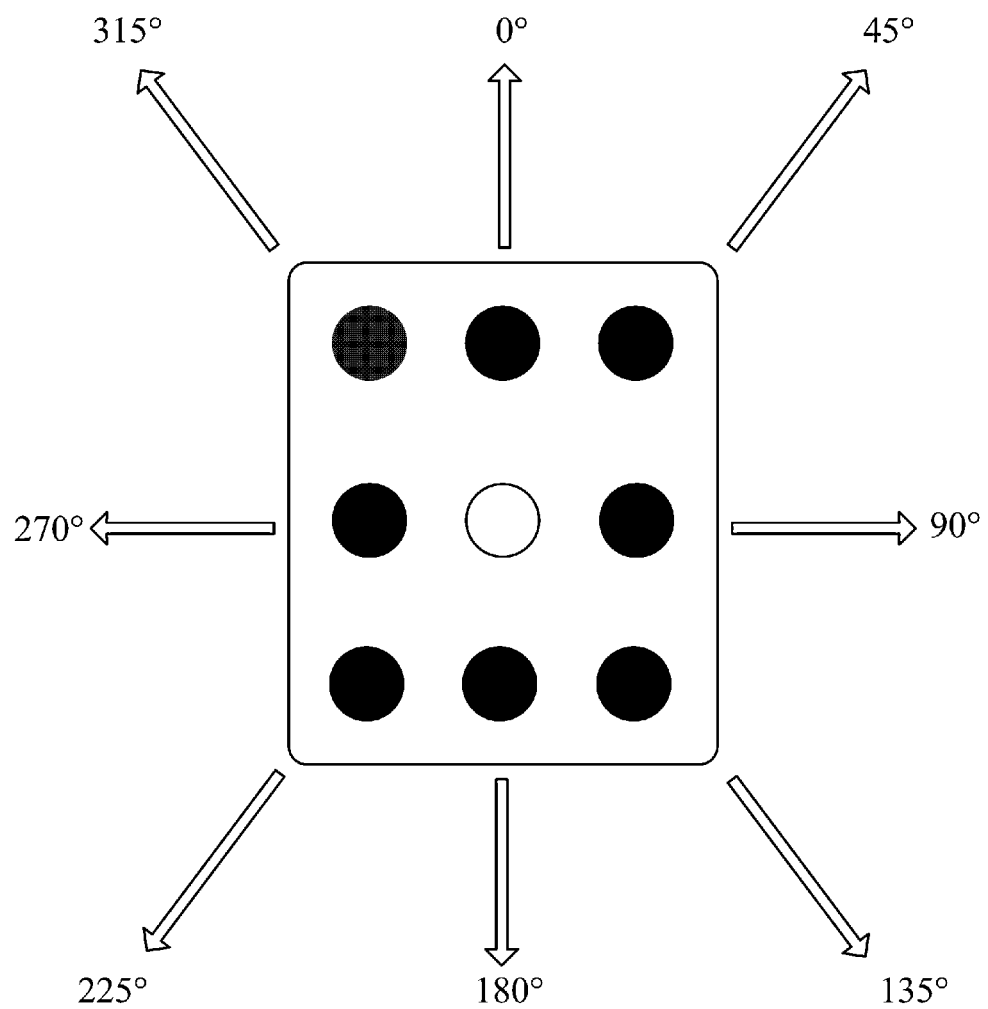
FIG. 5 illustrates the output of relative directional data via the tactile communication device according to an exemplary embodiment.

Further, FIG. 5 also illustrates how direction information is passed to the user 10 based on relative direction indication based on a bearing relative to the users 10 current direction.

Figure 6:
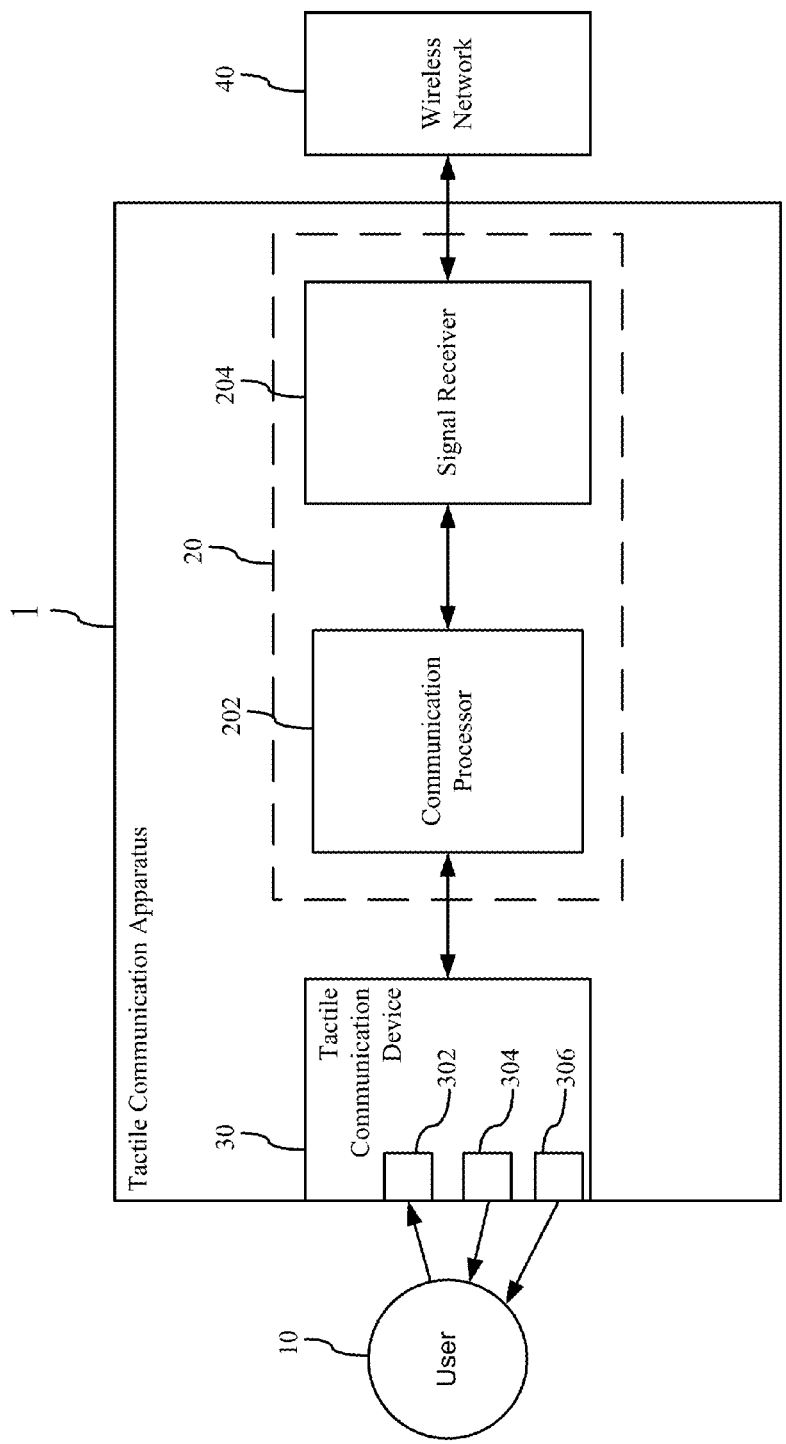
FIG. 6 is a block diagram of a tactile communication apparatus according to an exemplary embodiment.

FIG. 6 is a block diagram of an exemplary tactile communication apparatus 1. Data and information is sent to the tactile communication apparatus 1 via a wireless network 40. It should also be noted that data and information can also be sent to the tactile communication apparatus 1 via a wired network. The processing section 20 receives the data signal from the wireless network 40 at the signal receiver 204. The signal receiver 204 decodes the data signal and sends the data to the communication processor 202. The communication processor parses the data and generates pin activation signals that are sent to the tactile communication device 30 which physically communicates the data to the user 10 via the pins 304. Data and information can also be generated by the user 10 at the tactile communication device 30, via the keypad 302, and sent to the communication processor 202. The communication processor 202 will process the inputs received from the tactile communication device 30 and construct a formatted data or information message. The message will be sent to the signal receiver 204 which will generate a data packet based on the medium in which the message will be transmitted and then transmit the data packet to the wired or wireless network 40.

In another embodiment, the tactile communication device 30 can also include a vibration unit 306 to provide an additional means of tactile communication. The vibration unit 306 may be activated to provide general or non specific indication or acknowledgement of an event such as confirmation that a message has been sent, indication that a message has been received, or to notify the user 10 of an error.

Figure 7:
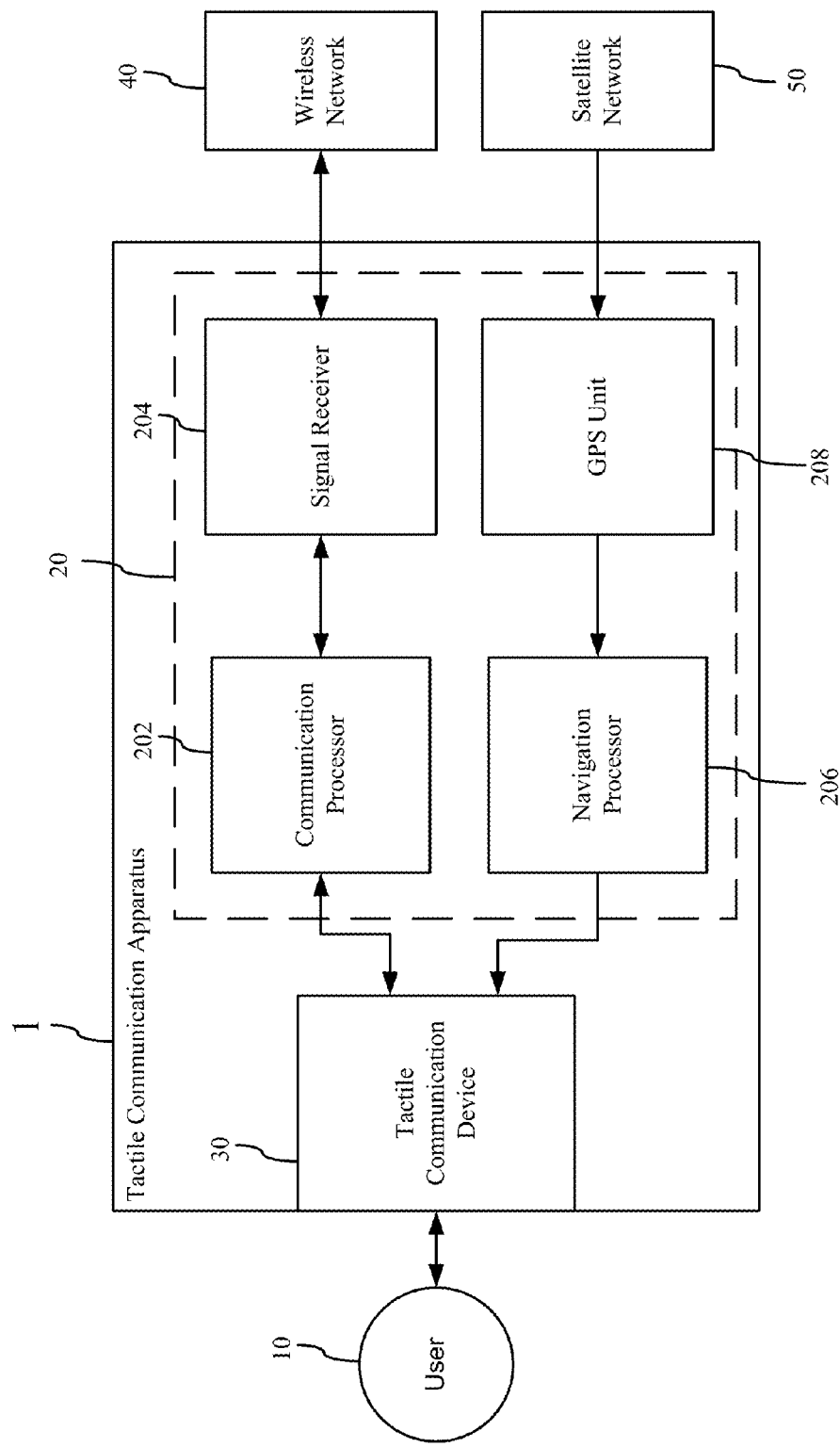
FIG. 7 is a block diagram of a tactile communication apparatus including navigational features according to an exemplary embodiment.

In another embodiment, FIG. 7 is a block diagram of a tactile communication apparatus 1 that can provide position and navigation functionality. In this embodiment, the processing section 20 also contains a GPS unit 208 that receives position data from a satellite network 50. The GPS unit calculates a current position based on the received position data and then sends the current position to the navigation processor 206. The navigation processor 206 can either relay the current position to the user 10 via the pins 304, or update navigation data to a predetermined location or object and provide directional information to the user 10 via the pins 304 based on a current position. Directional information, for example, can be provided to the user 10 via cardinal direction, as illustrated in FIG. 4B, or relative direction, as illustrated in FIG. 5. The user 10 can input a desired destination or object to the navigation processor 206, via the keypad 302, for which the navigation processor 206 will calculate directional information.

Figure 8:
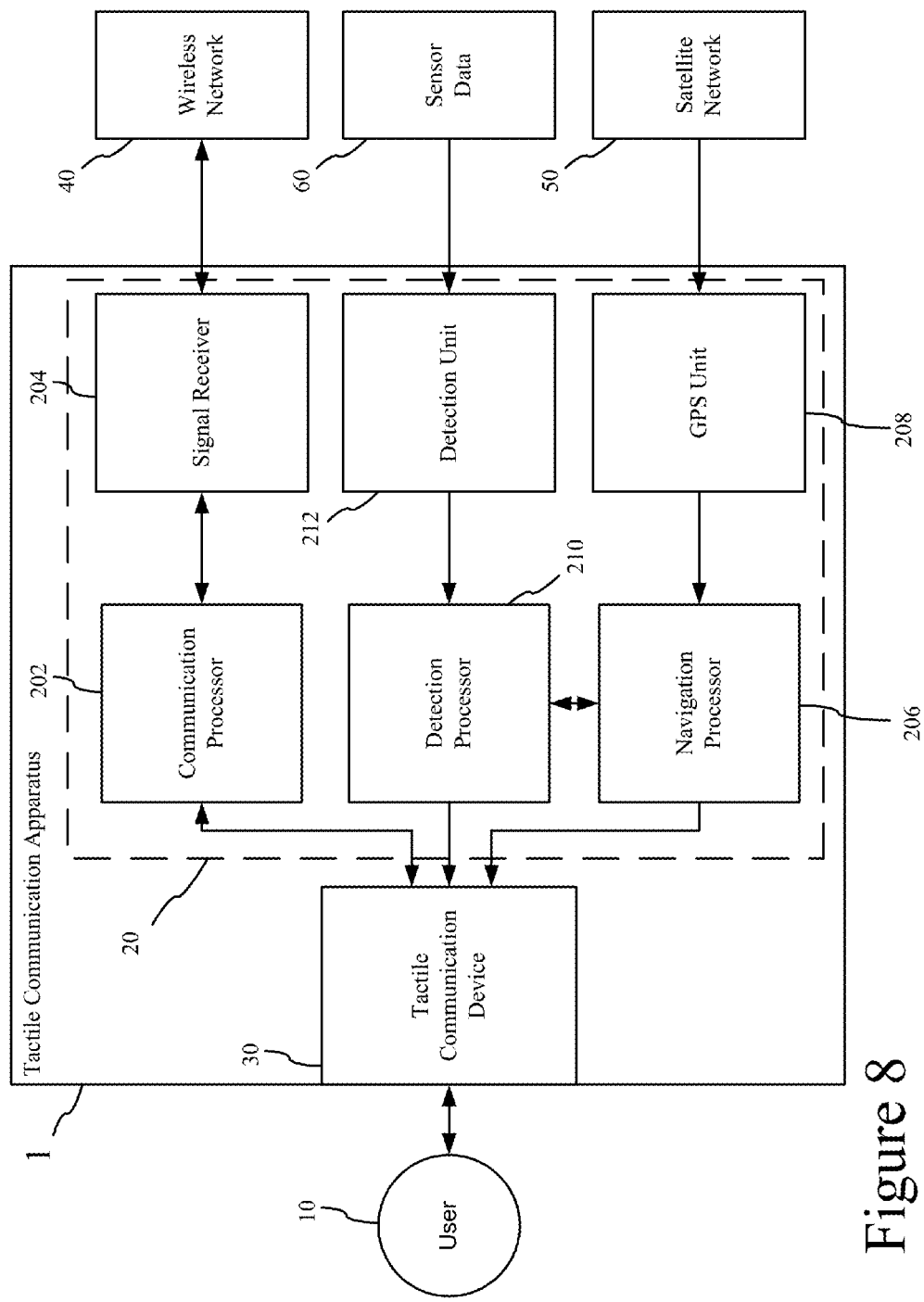
FIG. 8 is a block diagram of a tactile communication apparatus including detection features according to an exemplary embodiment.

In another embodiment, FIG. 8 is a block diagram of a tactile communication apparatus 1 that can provide object recognition and identification functionality. In this embodiment, the processing section 20 also contains a detection unit 212 that receives images or sensor data 60 of the surrounding environment of the user 10. Images or sensor data 60 can be obtained from an appropriate sensing mechanism such as a camera, video recorder, motion detection, or radar or sonar device. Data from one of these devices is received by the detection unit 212 where objects and features contained within the data can be identified and stripped or isolated. Object and feature data is then sent to the detection processor 210 where they are processed and compared to known or predetermined objects. If a match is made and an object or feature is recognized, the detection processor 210 will notify the user 10 via the tactile communication device 30 of the recognition.

In a non-limiting example of the above described process, the user 10 may wish to locate a nearby object, such as a digital camera. The user 10 would enter in an appropriate code into the keypad 302, such as "DC" for digital camera, to indicate to the tactile communication apparatus 1 that the user would like to locate this object. The tactile communication apparatus 1 would then receive image or sensor data 60 from the surrounding environment from an appropriate sensor (not shown), which can either be attached to the tactile communication apparatus 1 or a separate device. Image and sensor data 60 would then be fed into the detection unit 212 for image processing. Features and object located within the image and sensor data would then be sent to the detection processor 210 which would parse the features and objects until the digital camera was recognized.

Further, the detection processor could work in conjunction with the navigation processor so that once a desired object has been recognized or found, the navigation processor could guide the user 10 to the object using the pins 304 of the tactile communication device 30.

Figure 9:
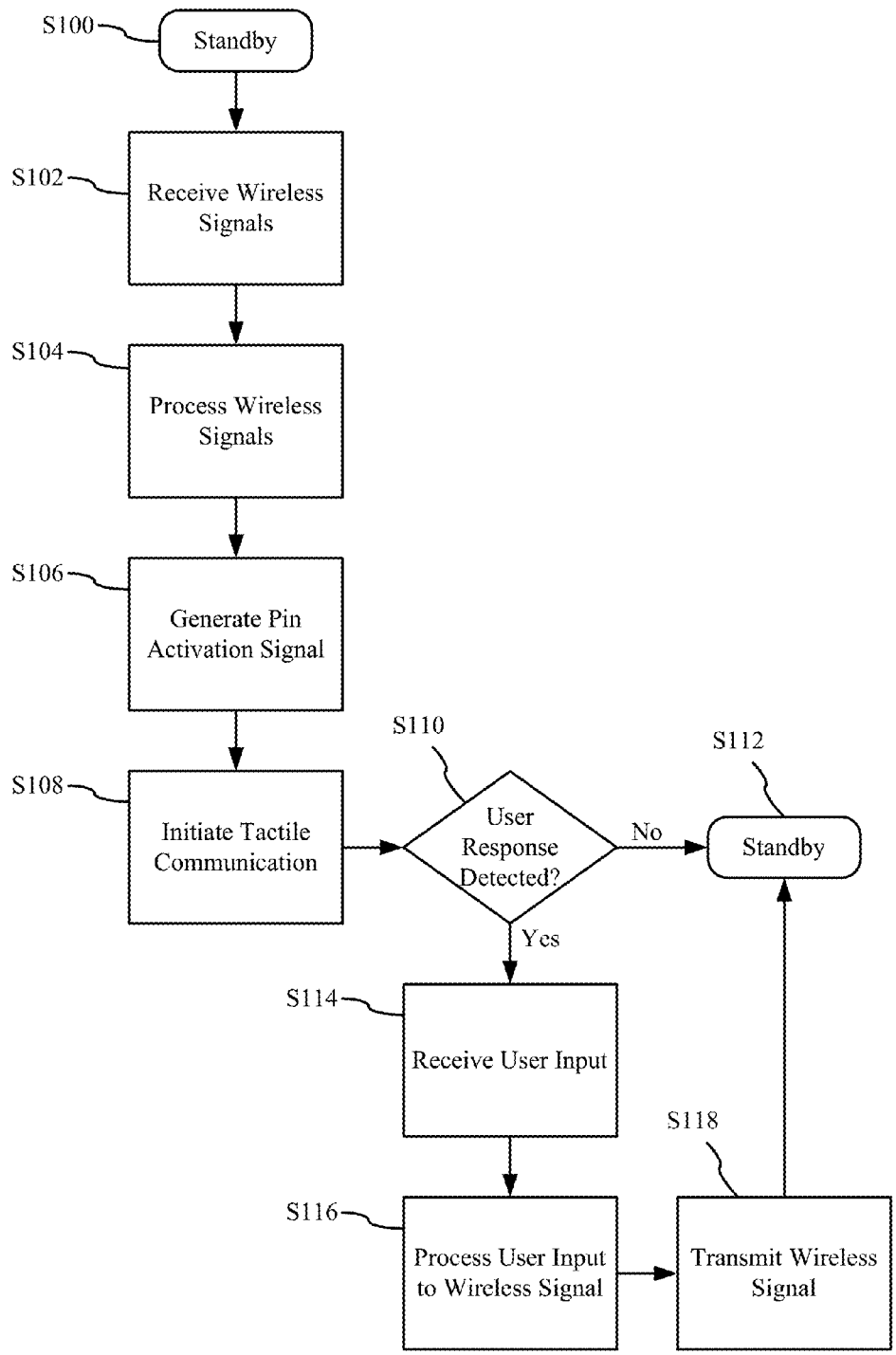
FIG. 9 is a sequence diagram illustrating the communication features of the tactile communication apparatus according to an exemplary embodiment.

FIG. 9 is a sequence diagram of a tactile communication apparatus 1 according to an exemplary embodiment. Initially, the tactile communication apparatus 1 may be standing by at step S100 to receive a wireless signal via the signal receiver 204. When a signal is received by the signal receiver 104 at S102, the signal is decoded or demodulated based on the type of network and protocols which the signal was received. The signal is then processed at the communication processor 202 to produce the data which is to be communicated to the user 10 at step S104. The communication processor 202 generates pin activation signals at step S106 and transmits the pin activation signals to the tactile communication device 30.

Once the tactile communication device 30 receives the pin activation signals at step 108 the tactile communication device 30 activates the appropriate pins in a specific sequence according to the pin activation signals so as to communicate the received data to the user 10. When the data has been communicated to the user 10 via the tactile communication device 30, the user 10 may or may not provide a response to the data to the tactile communication device 30 via the keypad 302 at step S110. If no user response is detected at step S110, the tactile communication apparatus 1 returns to a standby state at step S112. If the user 10 response has been detected at step S110 via the keypad 306, the communication processor receives the data from the tactile communication device 30 at step S114. The received data from user 10 is processed at step S116 so as to transmit the data via a wireless signal. Once the data has been encoded or modulated via the appropriate means based on the network, the data is transmitted over the wireless network at step S118. Finally, the tactile communication apparatus 1 returns to standby state at step S112.

Figure 10:
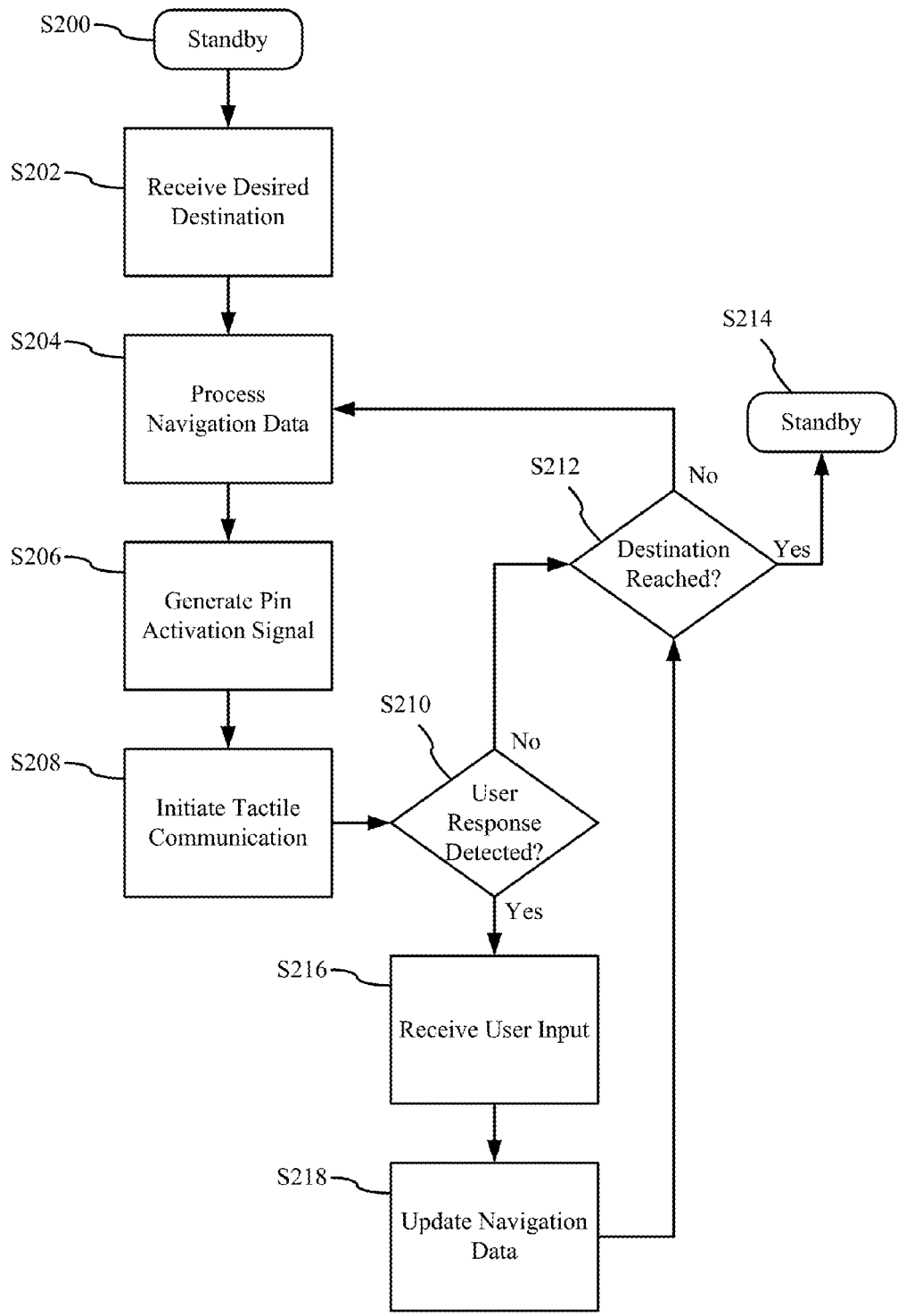
FIG. 10 is a sequence diagram illustrating the navigational features of the tactile communication apparatus according to an exemplary embodiment.

According to another embodiment, FIG. 10 is a sequence diagram of a tactile communication apparatus 1 illustrating the features out of providing navigational data to a user 10. Initially, the tactile communication apparatus 1 may be standing by at step S200 to receive a desired destination or location from user 10. Once a desired location or destination has been received from a user at step S202, the navigation processor 206 processes the destination data to produce navigation data at step S204. The navigation processor 206 also receives GPS data from the GPS unit 208. Once the navigational data has been generated by the navigation processor 206 at step S204 the navigation processor 206 generates pin activation signals at step S206 to communicate the navigation data to the user 10. Activation signals are received at the tactile communication device 30 at step S208 which initiates the tactile communication of the navigation data to the user 10. When the navigational data is being communicated to the user 10 the user may respond or continue to follow the navigation data at step S210. If the user provides no response and continues to follow the navigation data at step S210, a further determination will be made based on the continued supply of GPS data from the GPS unit 208 to determine if the user 10 has reached the desired destination at step 212. If the desired destination has not yet been reached at step S212 the tactile communication apparatus 1 continues to process navigation data at step S204 to continue to guide the user 10 to the desired destination. If a desired destination has been determined to be reached at step S212 the tactile communication apparatus returns to a standby state at step S214. Upon receiving tactile indication at step 208, the user 10 may respond to provide updated destination information or corrections at step S210. If user 10 response has been detected at step S210 the navigation processor 206 receives input from step S216 and then processes that information at step 218 to update or correct navigational data. The tactile communication apparatus 1 then determines if the new destination has been reached at step 212. If the new destination has not yet been reached at step S212 the tactile communication apparatus 1 continues to process navigation data at step S204. Otherwise the tactile communication apparatus 1 enters into a standby state once the new destination has been reached at step S214.

Figure 11:
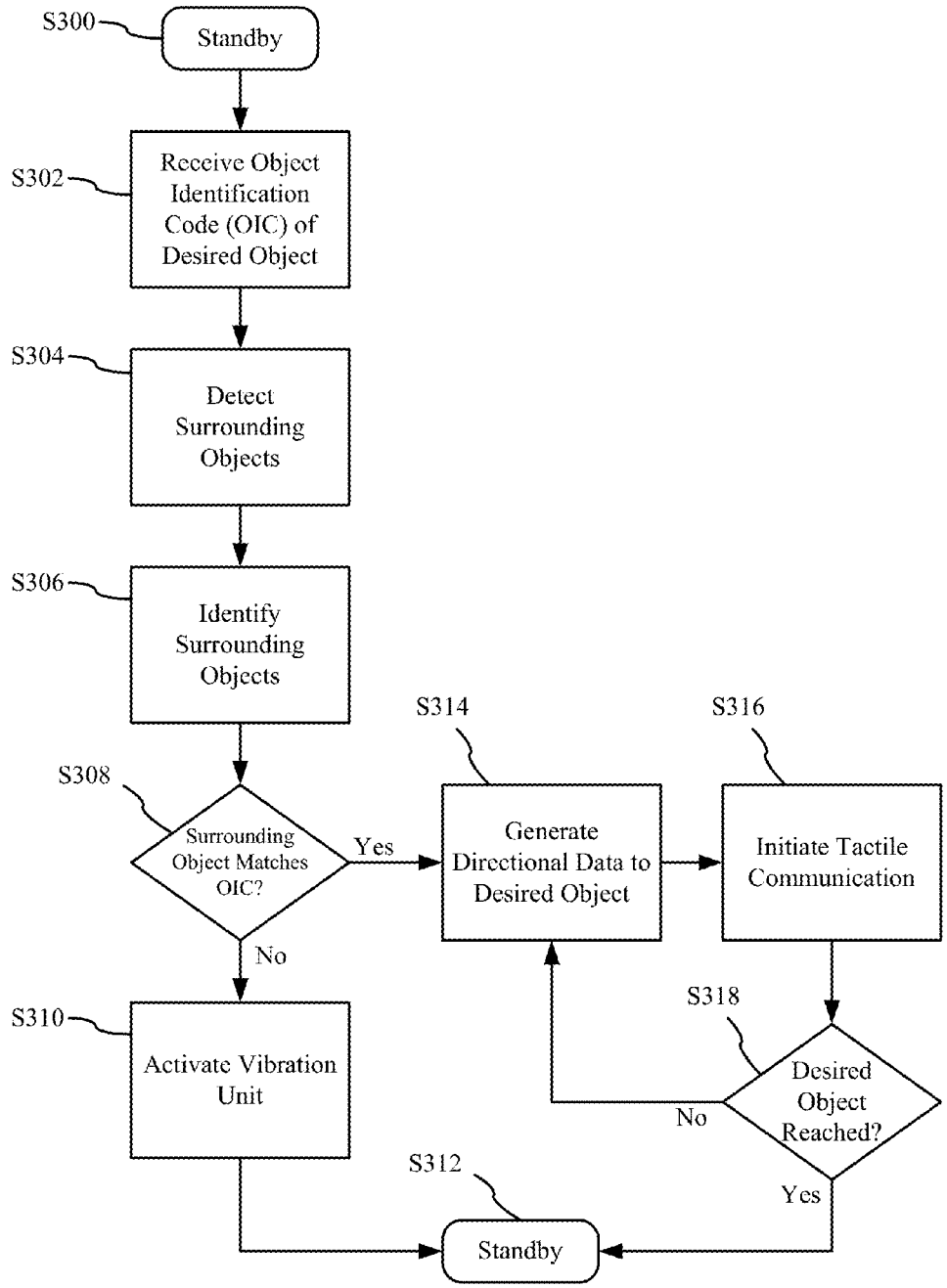
FIG. 11 is a sequence diagram illustrating the detection features of the tactile communication apparatus according to an exemplary embodiment.

According to another embodiment FIG. 11 is a sequence diagram of a tactile communication apparatus 1 providing the additional features of object identification and recognition. Initially the tactile communication apparatus 1 may be standing by at step S300 to receive an object identification code from the user 10. When an object identification code is received from the user 10 at step S302, via the keypad 302, the detection processor 210 receives sensor data 60 of a plurality of objects to be identified via the detection unit 212. Sensor data received by the detection unit 212 can be any form capable of being processed by the detection processor 210 such as image information, motion information, or radar or sonar information. Once the surrounding objects about the tactile communication apparatus 1 have been detected at step S304, the detection processor 210 processes and identifies objects and features contained within the sensor data at step S306. Once the sensor data has been processed at step S306, the detection processor 210 determines if an identified object or feature corresponds to the object identification code received from the user 10 at step S302. If a recognized object fails to match the object identification code at step S308, the tactile communication device 30 may indicate an error or a no match indication at step S310 via activating a vibration unit 306 in the tactile communication device 30. Once the user 10 is notified that no matches have been detected, the tactile communication apparatus 1 will return to a standby state at step S312. If at step S308 a match has been determined of a recognized object with the object identification code, the detection processor 210 may work in conjunction with the navigation processor 206 to generate directional data for the user to navigate to the recognized object at step S314. Navigation data to the recognized object will be communicated to the user via the tactile communication device 30 at step S316. When the user 10 has been successfully guided to the desired object at step S318 the tactile communication apparatus 1 returns to a standby state at step S312.

Figure 12:
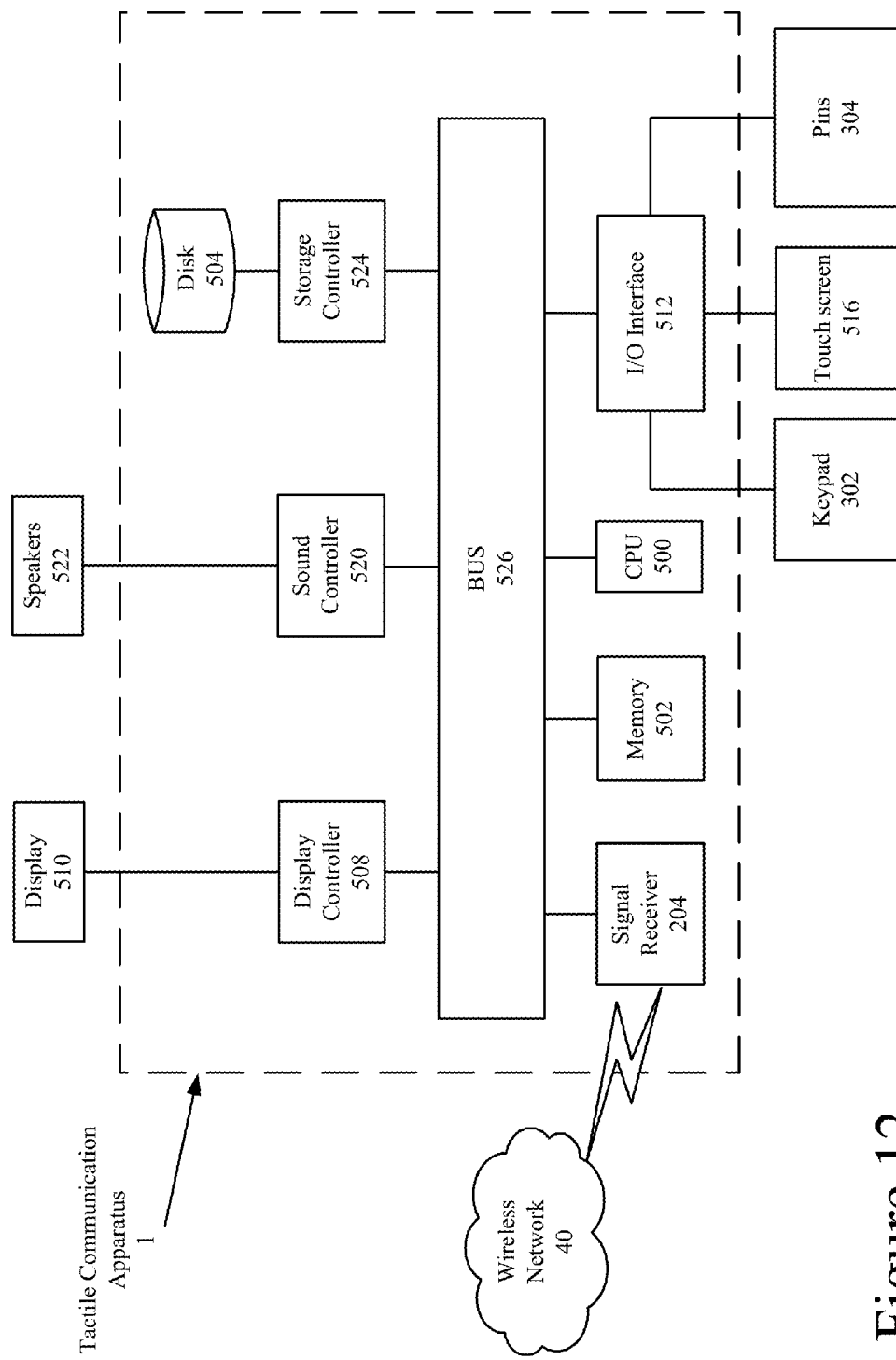
FIG. 12 is a hardware block diagram of a target tracking processor according to an exemplary embodiment.

Next, a hardware description of the tactile communication apparatus 1 according to exemplary embodiments is described with reference to FIG. 12. In FIG. 12, the tactile communication apparatus 1 includes a CPU 500 which performs the processes described above. The process data and instructions may be stored in memory 502. These processes and instructions may also be stored on a storage medium disk 504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the tactile communication apparatus 1 communicates, such as a server or computer.

Further, the claimed advancements may be provided as a utility application, background daemon, or component of an operating system, or combination thereof, executing in conjunction with CPU 500 and an operating system such as Microsoft Windows 7, UNIX, Solaris, LINUX, Apple MAC-OS and other systems known to those skilled in the art.

CPU 500 may be a Xenon or Core processor from Intel of America or an Opteron processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

The tactile communication apparatus 1 in FIG. 12 also includes a signal receiver 204, such as an Intel Ethernet PRO network interface card from Intel Corporation of America, for interfacing with wireless network 40. As can be appreciated, the wireless network 40 can be a public network, such as the Internet, or a private network such as an LAN or WAN network, or any combination thereof and can also include PSTN or ISDN sub-networks. The wireless network 40 can also be wired, such as an Ethernet network, or can be wireless such as a cellular network including EDGE, 3G and 4G wireless cellular systems. The wireless network can also be WiFi, Bluetooth, or any other wireless form of communication that is known.

The mobile tracking and subduing apparatus 20 further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keypad 302 as well as a touch screen panel 516 on or separate from display 510. General purpose I/O interface also connects to a plurality of pins 304.

A sound controller 520 is also provided in the tactile communication apparatus 1, such as Sound Blaster X-Fi Titanium from Creative, to interface with speakers/microphone 522 thereby providing sounds and/or music. The speakers/microphone 522 can also be used to accept dictated words as commands for controlling the tactile communication apparatus 1 or for providing location and/or property information with respect to the target property.

The general purpose storage controller 524 connects the storage medium disk 504 with communication bus 526, which may be an ISA, EISA, VESA, PCI, or similar, for interconnecting all of the components of the tactile communication apparatus 1. A description of the general features and functionality of the display 510, as well as the display controller 508, storage controller 524, network controller 506, and sound controller 520 is omitted herein for brevity as these features are known.

What is claimed is:

1. A tactile communication apparatus comprising:
a signal receiver configured to decode data received via a wireless signal;
a forearm support that holds the tactile communication apparatus to a user;
a portable tactile communication device containing a plurality of pins on one side and configured to be detachably attached over a palm of a user such that the one side having the plurality of pins contacts the palm of the user without restriction of finger movement, each pin configured to respectively move in an outward direction and an inward direction to form a plurality of pin combinations to be received in the palm of the user in response to a plurality of pin activation signals activating at least a portion of the plurality of pins; and
a communication processor configured to generate the plurality of pin activation signals determined from the received data so as to convey the data tactilly to a user through the plurality of pin combinations of the tactile communication device.

2. The tactile communication apparatus of claim 1, wherein
the pin combinations correspond to Braille characters.

3. The tactile communication apparatus of claim 2, wherein
the plurality of pins consisting of a three by three matrix of pins with a left column and a right column being used to convey Braille characters.

4. The tactile communication apparatus of claim 3, wherein
the one side of the tactile communication device containing the plurality of pins is ergonomically shaped in the form of a users palm such that each one of the plurality of pins, when moved in an outwards direction, comes into full contact with a palm of the users hand.

5. The tactile communication apparatus of claim 4, further comprising
a plurality of buttons located on the side opposite the one containing the plurality of pins on the tactile communication device, the plurality of buttons configured to receive input from the user.

6. The tactile communication apparatus of claim 5, further comprising:
a GPS unit configured to generate position and navigation data; and
a navigation processor configured to generate a plurality of activation signals based on the generated position and navigation data so as to convey the position and navigation data to the user through the plurality of pin combinations of the tactile communication device.

7. The tactile communication apparatus of claim 6, further comprising:
a detection unit configured to receive sensor data from a plurality of sensor sources; and
a detection processor configured to receive an object identification code of a desired object and process the received sensor data by extracting features and objects contained within the sensor data, comparing the extracted features and objects to the object identification code, and generating an activation signal based on the resulted of the matching.

8. The tactile communication apparatus of claim 7, wherein
when the detection processor finds a match between a desired object, the detection processor sends location information of the detected desired object to the navigation processor so as to generate navigational data to the desired object and convey the navigational data to the user through the plurality of pin combinations of the tactile communication device.

9. A tactile communication method using a tactile communications device of claim 1, the method comprising:
receiving with a signal receiver data in a wireless signal;
receiving a destination data from a user;
receiving a desired object data from a user;
generating navigational data based on GPS positional data and the received destination data;
matching the desired object data to sensor data received from a plurality of sensors;
generating with the communications processor a plurality of pin activation signals based on the received data, the navigational data, and the results of the matching; and
moving a plurality of pins of the portable tactile communication device in both an outward direction and inward direction to form a plurality of pin combinations corresponding to Braille characters or directional indications based on the plurality of activation signals, wherein the portable tactile communication device contains plurality of pins on one side and is configured to be detachably attached over a palm of a user such that the one side opposes the palm of the user without restriction finger movement, each pin configured to respectively move in an outward direction and an inward direction to form a plurality of pin combinations to be received in the palm of the user in response to the plurality of pin activation signals activating at least a portion of the plurality of pins.

10. A tactile communication system comprising:
a tactile communication apparatus of claim 1; and
a non-transitory computer-readable storage medium with computer readable instructions stored therein that when executed by a computer, cause the computer to execute a tactile communication method using the tactile communications device, the method comprising:
receiving with a signal receiver data in a wireless signal data via a wireless signal;
receiving a destination data from a user;
receiving a desired object data from a user;
generating navigational data based on GPS positional data and the received destination data;
matching the desired object data to sensor data received from a plurality of sensors;
generating with a communications processor a plurality of pin activation signals based on the received data, the navigational data, and the results of the matching; and
moving a plurality of pins of the portable tactile communication device in both an outward direction and inward direction to form a plurality of pin combinations corresponding to Braille characters or directional indications based on the plurality of activation signals wherein the portable tactile communication device contains plurality of pins on one side and is configured to be detachably attached over a palm of a user such that the one side opposes the palm of the user without restriction finger movement, each pin configured to respectively move in an outward direction and an inward direction to form a plurality of pin combinations to be received in the palm of the user in response to the plurality of pin activation signals activating at least a portion of the plurality of pins.

* * * * *